United States Patent [19]  [11] 4,029,730
Schroeder [45] June 14, 1977

[54] CORDLESS VEHICLE TIRE

[75] Inventor: Herman E. Schroeder, Hockessin, Del.

[73] Assignee: E. I. Du Pont de Nemours and Company, Wilmington, Del.

[22] Filed: June 25, 1975

[21] Appl. No.: 590,375

Related U.S. Application Data

[60] Continuation-in-part of Ser. No. 476,132, May 31, 1974, abandoned, which is a division of Ser. No. 217,033, Jan. 11, 1972, Pat. No. 3,860,052.

[52] U.S. Cl. .............................. 264/315; 152/354; 260/77.5 AC; 264/326
[51] Int. Cl.² ............................................ B29H 5/18
[58] Field of Search ........... 260/77.5 AC, 77.5 AM; 156/152; 264/315, 326; 152/354, 357

[56] References Cited

UNITED STATES PATENTS

| | | | |
|---|---|---|---|
| 3,208,500 | 9/1965 | Knipp et al. | 152/327 |
| 3,385,342 | 5/1968 | Eckert | 152/330 |
| 3,701,374 | 10/1972 | McGillvary | 152/330 |
| 3,755,261 | 8/1973 | VanGulick | 260/77.5 AM |

*Primary Examiner*—Lewis T. Jacobs

[57] ABSTRACT

A cordless vehicle tire of an elastomeric polyurethane sidewall adhered to a tread of an elastomeric ethylene/propylene/non-conjugated diene polymer wherein the polyurethane is the product of reacting an organic diisocyanate with a poly(alkylene oxide) glycol to prepare an isocyanato-terminated prepolymer cured by reaction with methylene dianiline introduced into the prepolymer in the form of a complex with salts of the group sodium chloride, sodium bromide, sodium iodide, sodium nitrite, lithium chloride, lithium bromide, lithium iodide, lithium nitrite or sodium cyanide, said methylene dianiline being liberated from said complex by heating the mixture of prepolymer containing complex, and a process for producing such tires.

5 Claims, No Drawings

CORDLESS VEHICLE TIRE

CROSS-REFERENCES TO RELATED APPLICATIONS

This application is a continuation-in-part of application Ser. No. 476,132, filed May 31, 1974, now abandoned, which in turn is a division of application Ser. No. 217,033, filed Jan. 11, 1972, now U.S. Pat. No. 3,860,052.

BACKGROUND OF THE INVENTION

This invention relates to a novel cordless vehicle tire and method for its manufacture.

Conventional vehicle tires containing cords are notoriously non-uniform and almost invariably require balancing when mounted in order to provide a smooth ride and even tire wear. A tire which is uniform to a greater extent than conventional tires in weight distribution would represent a substantial advance in eliminating the expense of balancing and improving smoothness of operation. Prior attempts to produce such tires have been unsuccessful — tires presently available commercially invariably require balancing, and perfect balancing is a practical impossibility.

Additional problems posed by conventional tires are that in order to obtain adequate rubber-to-cord adhesion, cords must be coated with one or more layers of complex adhesive compositions which requires the use of costly equipment. The cords in conventional tires also impose problems caused by factors such as stiffness, the tendency of polyester cords to degrade from attack by some rubber curing agent by-products and nylon's thumping caused by set occurring after the tire has been kept under load in one position. Furthermore, the elastomeric matrix of a conventional tire carcass built from layers of rubberized plies tends to be non-homogeneous which leads to a non-uniform cure and potential weak spots in the tire carcass.

Ease and rapidity of manufacture are important considerations in making tires. Prior to this invention it was necessary to cure tires made of polyurethane for relatively lengthy periods. The present invention provides a tire which permits curing of the polyurethane, generally, in less than about 2–6 minutes, while, at the same time, premature curing is quite easily avoided.

SUMMARY OF THE INVENTION

According to this invention there is provided a cordless vehicle tire of a polyurethane elastomer carcass-sidewall adhered to a tread of an ethylene/proplylene/-non-conjugated diene elastomer, the improvement which comprises said polyurethane sidewall consisting essentially of the product of reacting an organic diisocyanate with a poly(alkylene oxide) glycol to prepare an isocyanato-terminated prepolymer cured by reaction with methylene dianiline introduced into the prepolymer in the form of a complex with salts selected from the group consisting of sodium chloride, sodium bromide, sodium iodide, sodium nitrite, lithium chloride, lithium bromide, lithium iodide, lithium nitrite or sodium cyanide, said methylene dianiline being liberated from said complex by heating the mixture of prepolymer-containing complex.

The cordless vehicle tires are made by a process which comprises forming a carcass-sidewall by adding to a mold an isocyanato-terinated prepolymer made from the reaction of a poly(alkylene oxide) glycol with a molar excess of an organic diisocyanate containing dispersed therein a methylene dianiline salt complex wherein said salt is selected from the group consisting of sodium chloride, sodium bromide, sodium iodide, sodium nitrite, lithium chloride, lithium bromide, lithium iodide, lithium nitrite or sodium cyanide, heating the mixture to a temperature of at least about 100° C. to effect curing of said mixture and adhering to the resulting polyurethane-carcass-sidewall a tread consisting essentially of an ethylene/propylene/non-conjugated diene elastomer. The tire is cured sufficiently to be removed from the mold within about 100 seconds to 6 minutes and thus provides a rapid process for making tires. The polyurethanecan be cured in contact with the tread and thus simultaneously adhered thereto.

DETAILED DESCRIPTION OF THE INVENTION

Polyurethanes useful in making tire sidewalls of this invention are castable liquid prepolymers which can be cast to produce durable cured vehicle tire sidewalls. An eminently suitable product is a liquid isocyanato-terminated prepolymer having about 6.3 weight percent NCO groups and made by mixing one mole polytetramethylene-oxide glycol (number average molecular weight of 1000) with two moles 2,4-tolylene diisocyanate for 3–4 hours at 80° C.

One such class of liquid isocyanato-terminated polyurethanes is prepared by heating at a temperature of about 50° to 100° C. a polymeric glycol having a number average molecular weight of at least 750 with a molar excess of an organic diisocyanate to prepare an isocyanato-terminated prepolymer. The molar ratio of diisocyanate to polyol used is about 1.2–4.1 and preferably about 1.5–3.0. At the higher molar ratios, there will be some free organic diisocyanate present in the polymer. The presence of free organic diisocyanate in the polymer is particularly desirable when higher molecular weight polymeric glycols are being used since it tends to effect a decrease in the viscosity of the mixture. The molecular weight of the polymeric glycol and the molar ratio of organic diisocyanate to glycol should generally be selected so that the isocyanato-terminated prepolymer is a liquid.

Poly(alkylene oxide) glycols are reacted with a molar excess of an organic diisocyanate to prepare the isocyanate-terminated polymer. These glycols have the general formula $H(OR)_xOH$, wherein R is an alkylene radical which need not necessarily be the same in each instance and $x$ is an integer so that the number average molecular weight of the glycol is at least 750. They can be prepared by the polymerization of cyclic ethers such as ethylene oxide, propylene oxide, dioxalane or tetrahydrofuran. For purposes of the present invention, the preferred polyalkyleneether glycols are poly(tetramethylene oxide) glycol and poly(propylene oxide) glycol.

The polyalkyleneoxide-thiooxide glycols, prepared by condensing various glycols and thiodiglycol in the presence of a catalyst such as p-toluene sulfonic acid, can also be used.

The polyalkylene-arylene oxide glycols which can also be used are similar to the polyalkyleneether glycols except that some arylene radicals are present. In general, the phenylene and naphthylene radicals are preferred with or without substituents such as alkyl or alkylene groups. These polymeric glycols can be conveniently prepared by reacting a cyclic ether, such as ethylene oxide, with an arylene glycol.

The organic diisocyanates used include aromatic, aliphatic and cycloaliphatic types. Toluene-2,4-diisocyanate and 4,4'-methylenediphenyl diisocyanate are preferred. Other representative diisocyanates, such as 4-methyl-1,3-cyclohexane diisocyanate, 4-methoxy-m-phenylene diisocyanate, 4,4'-biphenyl diisocyanate, etc., can be used.

The active hydrogen-containing organic compound used for curing the prepolymers is methylene dianiline. It is employed in the form of a complex derived from the diamine and selected inorganic salts. This curing agent is prepared by forming a complex between the 4,4'-methylene dianiline and a salt, the salt being selected from nitrites and halides, except the fluorides, of sodium and lithium and sodium cyanide. Specifically, the compositions to be utilized as curing agents for the urethane prepolymers include the reaction products of 4,4'-methylene dianiline with the following salts, in the ratio of 3 moles of methylene dianiline to 1 mole of salt: sodium chloride, sodium bromide, sodium iodide, sodium nitrite, lithium chloride, lithium bromide, lithium iodide, lithium nitrite or sodium cyanide.

Because of the availability and cost, the comlexes derived from 4,4'-methylene dianiline and those in which the salt is sodium chloride or lithium chloride are especially preferred. The most preferred single complex is derived from 4,4'-methylene dianiline and sodium chloride.

There are a variety of methods for preparing the complexes of the instant invention.

In one method for prepring the complexes of this invention, an aqueous solution or brine containing a sodium or lithium salt selected from the class consisting of the chloride, bromide, iodide and nitrite is reacted with 4,4'-methylene dianiline (also referred to hereinafter as MDA), either in a solvent, having a degree of mutual solubility for both water and for the MDA, such as an alcohol, or with solid MDA in the substantial absence of a solvent. If the salt is present in relatively dilute concentration, for example between about 1% and about 12% by weight, a solvent for the MDA preferably is employed. If the salt is present in concentration above about 12 percent by weight, then no solvent need be employed, solid crystalline MDA being added directly to the salt solution.

A crystalline precipitate formed by interaction of the salt and the MDA is separated from the liquid phase, e.g., by filtration. The precipitate has a 3:1 mole ratio of MDA to salt and may be decomposed into its original constituents by adding a solvent such as acetone at an elevated temperature in the range of about 40° to 100° C., depending on the volatility of the solvent.

In the solvent method of preparing the complexes, a relatively dilute aqueous solution (1 to 12 percent by weight salt) of a sodium or lithium salt of the chloride, bromide, iodide, or nitrite may be mixed with a solution of 4,4'-methylenedianiline in a suitable solvent, e.g., methanol, at a temperature in the range from about 20° to 60° C. Under these conditions, the MDA reacts with the sodium or lithium salt to form a crystalline precipitate consisting of MDA and the salt in a 3:1 mole ratio. The crystalline precipitate is then separated from the mother liquid by filtration, decantation, centrifuging or other suitable operation.

In the method of preparation in which a more concentrated salt solution (more than about 12 percent by weight of salt) can be employed, solid crystalline MDA is added to the salt solution with agitation at a somewhat higher temperature in the range of from about 50° C. to 90° C. in an amount somewhat in excess of the stoichiometric quantity required to react with that amount of salt which is present in excess of about 12 precent by weight. Under these conditions three mols of MDA react with one mol of salt to form a crystalline precipitate which may be separated from the remaining solution by filtration, decantation, centrifuging or other suitable operation.

Complexes of other salts, such as sodium nitrite may be formed by substantially the same procedures outlines for the sodium chloride complexes.

Mixing of the finely divided complex with liquid prepolymers can be accomplished in dough mixers, high-speed impeller mixers, paddle-type mixers and the like. For best results it is preferred that the mix found in the foregoing types of mixers be further mixed (or the complex dispersed) by use of a three-roll mill such as is used in paint and ink manufacture. Improved dispersions can also be prepared in colloid mills. These various types of mixers and mills are described in "The Encyclopedia of Chemical Process Equipment", W. J. Mead, Reinhold (1964).

The complex may also be used in the form of a dispersion in an inert carrier liquid which is compatible with the polyurethane. Suitable liquids include aromatic ester plasticizers such as dioctyl phthalate, aliphatic ester plasticizers such as tetraethylene glycol di(2-ethyl hexoate) and highly aromatic hydrocarbon oils such as Dutrex 739 Oil a product of Shell Oil Co. The use of such dispersions simplifies metering and reduces the time and energy reqired for adequately blending the complex with the prepolymer.

In mixing the complex with fluid prepolymers to make the polyurethane sidewall the temperature must be kept below the decomposition point of the complex in order to avoid the possibility of premature curing. In the present process, the decomposition point of the complex is a function of the particular complex being used and the prepolymer in which the complex is dispersed. For isocyanato-terminated urethane prepolymers and the sodium chloride complex of methylene dianiline, mixing should be performed below 80° C. and preferably below about 50° C.

There is no requirement for a degassing step since pressure is maintained over the material in the mold. Setting of the molding is completed so rapidly that the pressure need be maintained for a minimal length of time, e.g., less than about three minutes, preferably less than about two minutes.

The prepolymer is also injected into the mold under pressure. The injection can be accomplished by means of any conventional type injecting apparatus such as ram or screw injection molding equipment. Because of the relatively low pressures required mold filling can also be accomplished by means of pumps. The pressure must be sufficiently high to prevent the degassing of the prepolymer. Typically, a pressure of about 100–800 psi will be sufficient, preferably about 250–500 psi. Higher pressures can be used if desired and practical. The pressure may come from any conventional source.

The temperature to be utilized during the curing of the urethane prepolymer will be about 100°–160° C., preferably about 110°–130° C. The higher temperatures are preferred because they accelerate the curing of the urethane prepolymer; however, the temperature must not be so high as to decompose the product.

Curing to an extent permitting demolding ordinarily takes less than about three minutes, preferably less than about two minutes and most preferably will take place within about 100 seconds.

At the end of this time the molded product is ejected or removed. The product is substantially bubble free with all of the air remaining dissolved within it.

In general, the amount of complex to be used should be not less than an amount which yields at least 60% of the total number of active hydrogen atoms theoretically required to react with all of the isocyanato groups. The preferred amount of organic compound to be used is such that the number of active hydrogen atoms present in the compound be about 70–100% of the total number of free isocyanato groups present in the isocyanato-terminated polymer. It is to be understood that greater or lesser amounts of the active hydrogen-containing organic compound can be used and the number of groups bearing active hydrogen atoms may approach or even exceed the number of free isocyanato groups in the polymer.

The tread for the tires of this invention is made of a cured ethylene/propylene/non-conjugated diene (EPDM) copolymer which can be cast or molded in the desired form.

The most preferred elastomer for use in the EPDM tire treads is a terpolymer containing 57.7 weight percent ethylene, 40 weight percent propylene, and 2.3 weight percent 1,4-hexadiene; its Mooney viscosity (ML-1+4/121° C.) is 60. In general the preferred elastomers have 35–45 weight % propylene and 2.1–2.5 weight % 1,4-hexadiene, the balance being ethylene. There should be at least 35 weight % propylene in order to minimize tread cracking; propylene content above 45 weight % tends to increase tire wear. The diene content should be at least about 2.1 weight % for adequate sulfur curing, but should not exceed about 2.5 weight % in order to minimize tread cracking. The Mooney viscosity is selected to achieve a good balance between the requirements of processability and tread strength. Low Mooney copolymers are more easily processed than high Mooney copolymers; however, the latter are stronger. A Mooney viscosity in the vicinity of 60 (ML-1+4/121° C.) is most preferred.

For passenger tire use where minimum tread cracking is important, the copolymers should be substantially linear, that is, substantially free from side-chains containing a plurality of monomer units. The linear copolymers do, of course, have side-chains which are part of monomer units incorporated into the copolymer main-chain. Thus propylene units contribute methyl side-chains. In order to enhance the linearity it is desirable to keep the conversion of the 1,4-hexadiene (or other mono-reactive acyclic non-conjugated diene) below about 25%.

The most preferred diene is 1,4-hexadiene. Acyclic mono-reactive non-conjugated dienes form a class of preferred dienes; the reactive double bond is mono-substituted whereas the other double bond is di, tri, or tetra substituted. Two examples of this class are 1,4-hexadiene and 11-ethyl-1,11-tridecadiene. It is to be understood that composite tires intended for less demanding uses, such as on off-the-road tractors and the like, can have EPDM treads made from branched copolymers and from copolymers containing less preferred non-conjugated dienes such as the bicyclic dienes, e.g., 5-ethylidene-2-norbornene, 5-methylene-2-norbornene, 5-ethyl-2,5-norbornadiene, 5-(2'-butenyl)-2-norbornene, and dicyclopentadiene. Alternative dienes include 1,5-cyclooctadiene, tetrahydroindene, and 4-vinyl-cyclohexene.

The EPDM's and methods for preparing them are well known in the art; see, e.g., U.S. Pat. Nos. 2,933,480; 3,000,866; 3,063,973; 3,093,620; 3,095,621 and 3,260,718.

Each 100 parts by weight of EPDM is most preferably compounded with 100 parts of ISAF carbon black (ASTM type N220) and 75 parts of paraffinic petroleum oil. Other preferred blacks are ATSM types 231 and 242. Carbon blacks of lower structure or greater size can be employed, but the tread will not display optimum performance. For reason of economics at least about 80 parts of black are used; tread wear may worsen if more than about 125 parts of black are used.

Paraffinic petroleum oil is preferred for extending the tread composition; alternatively, naphthenic petroleum oils are suitable. Aromatic petroleum oils are undesirable because their unsaturation consumes sulfur needed to cure the EPDM copolymer. The amount of oil required will depend on the amount of carbon black, higher proportions of black calling for higher proportions of oil (thus 40 phr oil for 80 phr black and 100 phr oil for 125 black).

The EPDM tread can be sulfur-cured using combinations of a wide variety of known reagents and techniques. Generally at least 3 parts of zinc oxide per 100 parts of EPDM are present to insure adequate vulcanizate strength; 5 parts are preferred and provide the best balance of cost and performance. The remaining components can be selected to provide bloom resistant treads when needed. A preferred non-blooming composition calls for 1 part stearic acid, 2.5-3 parts [(C$_4$H$_9$O)$_2$PS$_2$]$_2$ Zn (Monsanto's "Vocol"), 1.5 parts 2,2'-dithiobisbenzothiazole, and 1.5 parts sulfur per 100 parts of EPDM. Another non-blooming composition contains 1.5 parts tetraisopropyl thioperoxydiphosphate

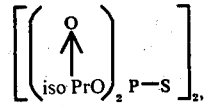

1.0 part 2-mercaptobenzothiazole (or 2,2'-dithiobisbenzothiazole), and 1.5 parts sulfur per 100 parts of EPDM. Still another non-blooming system contains 2 parts zinc dibutyldithiocarbamate, 0.5 part tetramethylthiuram disulfide, 0.8 part 2-mercaptobenzothiazole, and 1.5–2 parts sulfur per 100 parts rubber. A composition where bloom may occur has 1.5 parts tetramethylthiuram monosulfide, 0.8 part 2-mercaptobenzothiazole, and 1.5 parts sulfur. The EPDM sample containing the curing system is ordinarily heated to a temperature of 160°–204° C. for about 1–20 minutes to effect cure.

The composite vehicle tires of this invention can be made by adhering the preformed sidewall to the preformed tread. The preformed sidewall and tread can be made by conventional casting and compression and injection molding techniques and equipment. The tread is preferably made with conventional injection equipment adapted to injection mold elastomeric material and cure the molded product. The preformed polyurethane sidewall is preferably made by the casting procedure described hereinbefore. The two preformed components are fitted together and adhered using a suitable adhesive, or the polyurethane is cured in contact with the tread, or one of these components can be formed and the other then formed in contact with the first formed component. When this procedure is followed it is preferred that the tread be made first and the sidewall formed in contact with the tread.

Preferred equipment for forming the tread is a reciprocating screw type injection molding machine in which shearing occurs to provide additional heating. In such equipment, sufficient heat is built up to effect curing of the EPDM in the mold cavity in about 1–3 minutes.

In any case it is important that the EPDM tread be pretreated with an adhesive or other agent which promotes adquate adhesion between tread and sidewall. In a preferred embodiment of this invention the tread is pretreated (prior to contact with the sidewall) by irradiation in air with ultraviolet light in an amount of at least about three joules/cm$^2$ and then coated with a 5% solution of tris-(p-isocyanato phenyl) methane in methylene chloride or a similar solution of a mixture of polymeric polyisocyanates having the structure

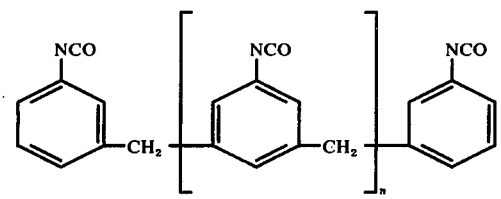

where $n = 0,1,2, ....$ for the component molecules and 0.3–0.4 for the mixture itself. Other pretreatments which may be used include treatments with flame, electrostatic fields, gas, magnetic fields, ozone and the like by conventional procedures for imparting tack or adhesiveness to EPDM polymer compositions.

An especially preferred procedure involves injection molding of EPDM tread and removing it from the mold prior to complete cure. The curing operation of the EPDM tread is carried to completion in the tire mold during casting of the polyurethane sidewall.

It also may be desirable to mold the sidewall and tread in a form such that there are convolutions or grooves on the surface to be adhered to the other component. These convolutions thus interlock when the sidewall and tread are placed in contact and provide increased resistance to slippage at the tread-sidewall interface.

The sidewalls of this invention are outstanding in their physical properties. They have a Young's modulus of about 5000–50,000 psi (332–3520 kg./cm.$^2$) at 30° C. [the preferred materials have a Young's modulus of about 10,000–30,000 psi (703–2109 kg./cm.$^2$) at room temperature], a tensile strength of at least 1500 psi (106 kg./cm.$^2$) [the preferred materials have a tensile strength of at least 2500 psi (176 kg./cm.$^2$)] and they exhibit a creep elongation of not more than 5% when subjected to a tensile stress of 500–1000 psi (35.5–70.3 kg./cm.$^2$) for 1000 hours. Because of these properties, the tire carcasses of this invention have excellent load-bearing properties and flex life.

The EPDM treads exhibit outstanding resistance to ozone degradation and are tough, abrasion resistant and have excellent load-bearing qualities.

The tires of this invention are inexpensively, rapidly and simply prepared, are substantially uniform throughout and are tough, durable and long wearing.

The invention is illustrated by the following examples wherein parts and percentages are by weight unless otherwise indicated.

EXAMPLE 1

A. Preparation of EPDM Tread Stock

The EPDM employed is a terpolymer having a Mooney viscosity (ML-1+4/121° C.) of about 60 and composed of units of the following monomers: ethylene (55 wt. %); propylene (41 wt. %); and 1,4-hexadiene (4 wt. %). The polymer contains about 0.34 gram-moles of sulfur-curable ethylenic groups per kilogram.

This EPDM is compounded according to the following recipe to make a tread stock:

| Component | Parts by Weight |
| --- | --- |
| EPDM | 100 |
| Paraffinic petroleum oil* | 75 |
| ISAF carbon black** | 100 |
| Zinc oxide | 5 |
| Zinc stearate | 1.5 |
| Sulfur | 1.5 |
| 2-Mercaptobenzothiazole | 0.8 |
| Zinc dibutyldithiocarbamate | 1.5 |

*Commercially available as Sunpar® 150 from Sun Oil Company. ASTM D-2226 Type 104B. Saybolt Universal Viscosity 508 at 37.8° C. and 64.3 at 98.9° C.
**ASTM type N220.

The above components are mixed in a Banbury internal mixer for 5 to 10 minutes.

B. Injection Molding of EPDM Tread (Cap)

The EPDM tread stock made in Part A above is fed into the heated barrel of a reciprocating screw type injection molding machine where shearing occurs to provide additional heat. Rotation of the screw meters a predetermined amount of the plasticized, homogenized material into the forward end of the barrel. The screw then stops rotating and moves forward to ram the hot material through the nozzle, runners and gates into a heated mold cavity where it is vulcanized to form a uniform one-piece seamless tread. During the early stages of vulcanization, the screw is held in the forward position at a predetermined pressure to consolidate the molding. After a given time, the screw starts turning and reciprocating, thereby feeding more plasticized material into the forward end of the barrel for the next injection.

In a typical operation, a one-piece tread is molded for a F 78–14 low profile passenger vehicle tire. An injection molding machine is employed capable of exerting a 1350-ton (1.225 million kg.) clamping pressure on two halves of the single cavity mold.

Typically, the 10-lb. (4.5 kg.) charge of EPDM tread stock is at room temperature when fed into the barrel. The reciprocating screw inside is cored to allow passage of cooling water at normal room temperature, e.g., 20°–24° C. The outside barrel temperatures for the successive feed, compression and metering zones in the barrel are 48°–52° C., 66° C. and 79°–85° C., respectively. Typically, each zone occupies about a third of the length of the barrel. The screw rotates at 50 rpm. for about 50 seconds while compacting and heating the charge under a back pressure of about 50–250 psi (3.5–17.6 kg./cm$^2$).

Coupled to the metering zone is a nozzle adapter at 77.2° C; the surface of the nozzle immediately downstream is at 177°–194° C. Over a 30-second period the compacted tread stock is injected at 138°–149° C. under a pressure of 13,000–17,000 (914–1195 kg./cm$^2$) into the mold cavity and held at 13,000–17,000 psi (914–1195 kg./cm$^2$) for 15 seconds longer. Screw pressure is then released. After the stock has been in the mold for 90 seconds, the tread thus formed is cured enough to be removed. The injection molding cycle time (mold closing to mold closing) is 150 seconds. The tread is then conveyed through a chamber where it is heated for 5 minutes at 190° C.

C. Preparation of Adhesively Coated EPDM Tread

The underside (inner periphery) is cleaned with 1,1,1-trichloroethane, dried, irradiated with ultraviolet light (about 3 joules/cm$^2$) and coated with the following adhesive composition:

| | Parts by Wt. |
|---|---|
| Liquid polyester A* | 3.3 |
| "Desmocoll-12" (Farbenfabriken Bayer) | |
| Liquid polyester B** | 1.6 |
| "Desmocoll-22" (Farbenfabriken Bayer) | |
| 4,4',4''-Methylidynetris (phenylisocyanate) | 3.4 |
| Methylene Chloride | 13.6 |

*A highly branched liquid polyester containing 4.8–5.3 wt. % hydroxyl substituent groups and exhibiting (in each case at 20° C.) a density of 1.12 g/cm$^3$ and a viscosity of 155–165 poises.
**A slightly branched liquid polyester containing 1.7–2.0 wt. hydroxyl substituent groups. The density and viscosity at 20° C. are 1.18 g/cm$^3$ and 290–310 poises, respectively.

When dry, this coated tread is ready for use. The coating should not be abraded.

D. Preparation of Isocyanato-Terminated Prepolymer

A liquid isocyanato-terminated prepolymer having about 6.3 wt. % NCO groups is made by mixing one mole of polytetramethyleneether glycol (number-average molecular weight 1000) with two moles of 2,4-tolylene diisocyanate for 3–4 hours at 80° C.

E. Preparation of Dispersion of Complex

One hundred parts of the sodium chloride complex of methylene dianiline previously ground to 5 microns or less in a fluid energy mill, 100 parts of di(2-ethylhexyl)phthalate and 1 part of lecithin are ball milled for 24 hours.

F. Casting Cordless Polyurethane Carcass and Sidewall Adhered to the Cured Unitary EPDM Tread The coated cured EPDM tread prepared in Part A above is placed inside a two-piece heated mold having a cavity in the shape of an F 78-14 low profile passenger tire. Also positioned therein are brass coated steel bead wires whichhave been primed with an epoxy primer composition (Thixon AB-1244). The mold is maintained at 177° C.

A self-curable liquid polyurethane composition is made by mixing 33 parts of the dispersion of the sodium chloride complex of methylene dianiline with 100 parts of the isocyanato-terminated prepolymer at a temperature of 50 C. This composition is injected at 300 psi into the mold cavity and kept there at 177° C. for about 2 minutes to form a tire carcass and sidewall adhered to the tread. The resulting tire is then removed from the mold and postcured at 120° C. for two hours.

I claim:
1. A process for rapidly making a cordless vehicle tire which comprises adding to a mold containing an ethylene/propylene/non-conjugated diene elastomer tread an isocyanato-terminated prepolymer made from the reaction of an organic diisocyanate and a poly(alkylene oxide) glycol containing dispersed therein a methylene dianiline salt complex wherein said salt is selected from the group consisting of sodium chloride, sodium bromide, sodium iodide, sodium nitrite, lithium chloride, lithium bromide, lithium iodide, lithium nitrite or sodium cyanide, heating the prepolymer to a temperature of at least about 100° C in contact with the tread to simultaneously effect curing and adherence of the resulting polyurethane-carcass-sidewall to the tread.

2. A process of claim 1 wherein the tire is removed from the mold in less than about 3 minutes.

3. A process of claim 1 wherein the salt is sodium chloride.

4. A process of claim 1 wherein the non-conjugated diene is 1,4-hexadiene.

5. A process of claim 1 wherein the tread added to the tire mold is partially cured during its formation by injection molding, and curing of said tread is completed in the tire mold during casting and curing of said prepolymer.

* * * * *